US011465841B2

(12) United States Patent
Negron et al.

(10) Patent No.: US 11,465,841 B2
(45) Date of Patent: Oct. 11, 2022

(54) ARTICLE CAROUSEL

(71) Applicant: TKO Mountings, LLC, Montgomeryville, PA (US)

(72) Inventors: Roy Milan Negron, Telford, PA (US); Roy Negron, Chalfont, PA (US); John Paul Carr, II, Palm Harbor, FL (US)

(73) Assignee: TKO Mountings, LLC, Montgomeryville, PA (US)

( * ) Notice: Subject to any disclaimer, the term of this patent is extended or adjusted under 35 U.S.C. 154(b) by 0 days.

(21) Appl. No.: 17/214,658

(22) Filed: Mar. 26, 2021

(65) Prior Publication Data
US 2021/0309458 A1 Oct. 7, 2021

Related U.S. Application Data

(60) Provisional application No. 63/003,878, filed on Apr. 1, 2020.

(51) Int. Cl.
*B65G 1/04* (2006.01)
*B65G 1/133* (2006.01)
*B65G 47/64* (2006.01)

(52) U.S. Cl.
CPC ........... *B65G 1/0457* (2013.01); *B65G 1/133* (2013.01); *B65G 47/648* (2013.01); *B65G 2203/0283* (2013.01); *B65G 2207/48* (2013.01)

(58) Field of Classification Search
CPC ...... B65G 1/0457; B65G 1/133; B65G 9/008; B65G 47/648; B65G 2203/0283; B65G 2207/48; A63B 69/20; A63B 69/201; B61J 1/06; E01B 25/26; A63H 21/02; A63H 3/008; A61G 7/1042
See application file for complete search history.

(56) References Cited

U.S. PATENT DOCUMENTS

| 272,432 | A | * | 2/1883 | Harrington | ................ B61J 1/06 104/99 |
| 308,553 | A | * | 11/1884 | Cartwright | ................ B61J 1/06 104/99 |
| 457,822 | A | * | 8/1891 | Paige | ......................... B61J 1/06 104/99 |
| 582,436 | A | * | 5/1897 | Ridgway | ............... B65G 9/008 104/99 |
| 685,822 | A | * | 11/1901 | Cook | ......................... B61J 1/06 104/99 |
| 754,396 | A | * | 3/1904 | Steedman | .............. B65G 9/008 104/99 |
| 764,781 | A | * | 7/1904 | Sumner | .................. B65G 9/008 104/99 |

(Continued)

FOREIGN PATENT DOCUMENTS

DE 19538986 A1 * 4/1997 ............. E01B 25/26

*Primary Examiner* — William R Harp
(74) *Attorney, Agent, or Firm* — Inspired Idea Solutions Law Firm

(57) ABSTRACT

An article carousel may be configured for use with a track system. The article carousel may include a frame and a plate configured for movement with respect to the frame. The plate may include one or more carriers configured to receive one or more trolleys. Movement of the plate may enable each carrier to be aligned with the track system. During alignment, one or more trolleys may be transferred between each carrier and the track system.

1 Claim, 12 Drawing Sheets

(56) References Cited

U.S. PATENT DOCUMENTS

| | | | | |
|---|---|---|---|---|
| 836,042 | A * | 11/1906 | Johnston | B61J 1/06 104/99 |
| 1,018,407 | A * | 2/1912 | Cameron | B61J 1/06 104/99 |
| 1,345,851 | A * | 7/1920 | Hassler | B61L 23/002 104/99 |
| 1,684,986 | A * | 9/1928 | Chalmers | B61J 1/06 104/99 |
| 2,360,505 | A * | 10/1944 | Medenwald | B66C 7/00 191/8 |
| 3,422,769 | A * | 1/1969 | Sims | B61J 1/06 104/99 |
| 3,696,890 | A * | 10/1972 | Armstrong | B65G 9/006 186/40 |
| 6,530,867 | B2 * | 3/2003 | Schwendemann | A63B 69/004 482/83 |
| 8,051,777 | B2 * | 11/2011 | Weissbrodt | B65G 47/648 104/102 |

\* cited by examiner

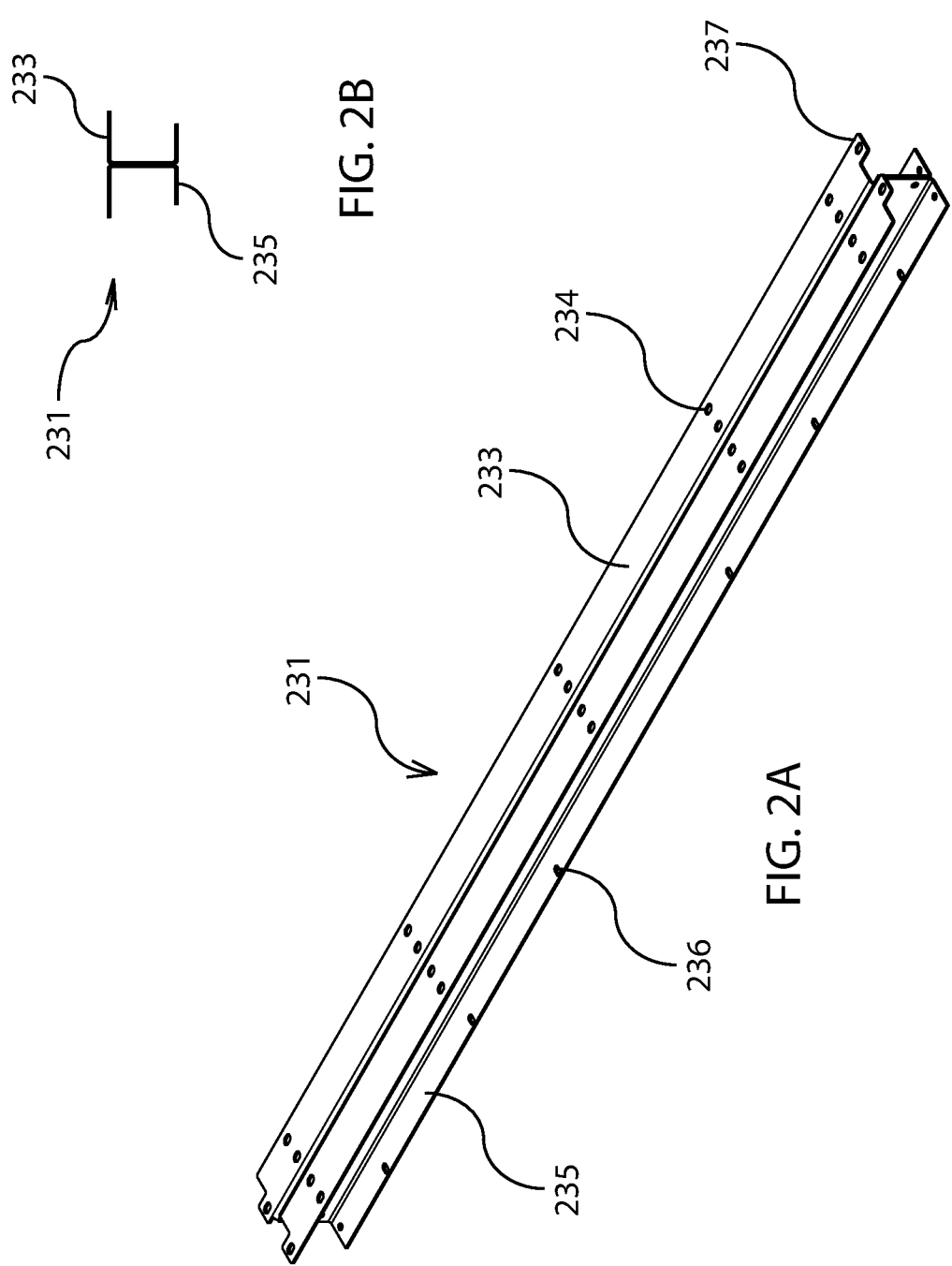

ARTICLE CAROUSEL

FIELD

The present disclosure generally relates to track systems, and more particularly to an article carousel.

BACKGROUND

Track systems may be used for passing articles a distance, such as from a first position to a second position. Track systems may be used in residential and/or commercial applications and may further be used in combination with one or more articles to be moved along the track system. Articles may be moved to or from a storage position and to or from various use positions.

Therefore, it would be desirable to optimize storage and movement of articles in connection with the track system in order to improve performance and versatility of functional training systems.

SUMMARY

A carousel, capable of interacting with a track system, the carousel comprises a frame; a plate configured for movement with respect to the frame; one or more carriers attached to the plate, and one or more trolleys, each carrier configured to receive the one or more trolleys, wherein movement of the plate enables alignment of each carrier with the track system, such that the one or more trolleys may be transferred between each carrier and the track system during alignment.

An article transfer system comprises a track system; and a carousel, the carousel including: a frame, a plate configured for movement with respect to the frame, one or more carriers attached to the plate, and one or more trolleys, each carrier configured to receive the one or more trolleys, wherein movement of the plate enables alignment of each carrier with the track system, such that the one or more trolleys may be transferred between each carrier and the track system during alignment.

In accordance with a method of operating an article transfer system having a track system and a carousel, the carousel having frame, a plate configured for movement with respect to the frame, one or more carriers attached to the plate, and one or more trolleys configured on one or both of the track system and the one or more carriers, the method comprises configuring the carousel such that the one or more carriers may each align with the track system during movement of the plate; aligning a first of the one or more carriers with the track system by moving the plate; and transferring the one or more trolleys between the track system and the first of the one or more carriers during alignment.

BRIEF DESCRIPTION OF THE DRAWINGS

Various aspects and advantages will become apparent upon review of the following detailed description and upon reference to the drawings in which:

FIG. 2A illustrates an isometric view of a track segment.

FIG. 2B illustrates a cross-sectional view of a track segment.

DETAILED DESCRIPTION

The following disclosure includes a method and apparatus for operating a carousel in conjunction with a track system for moving and storing articles.

Figure 1A:
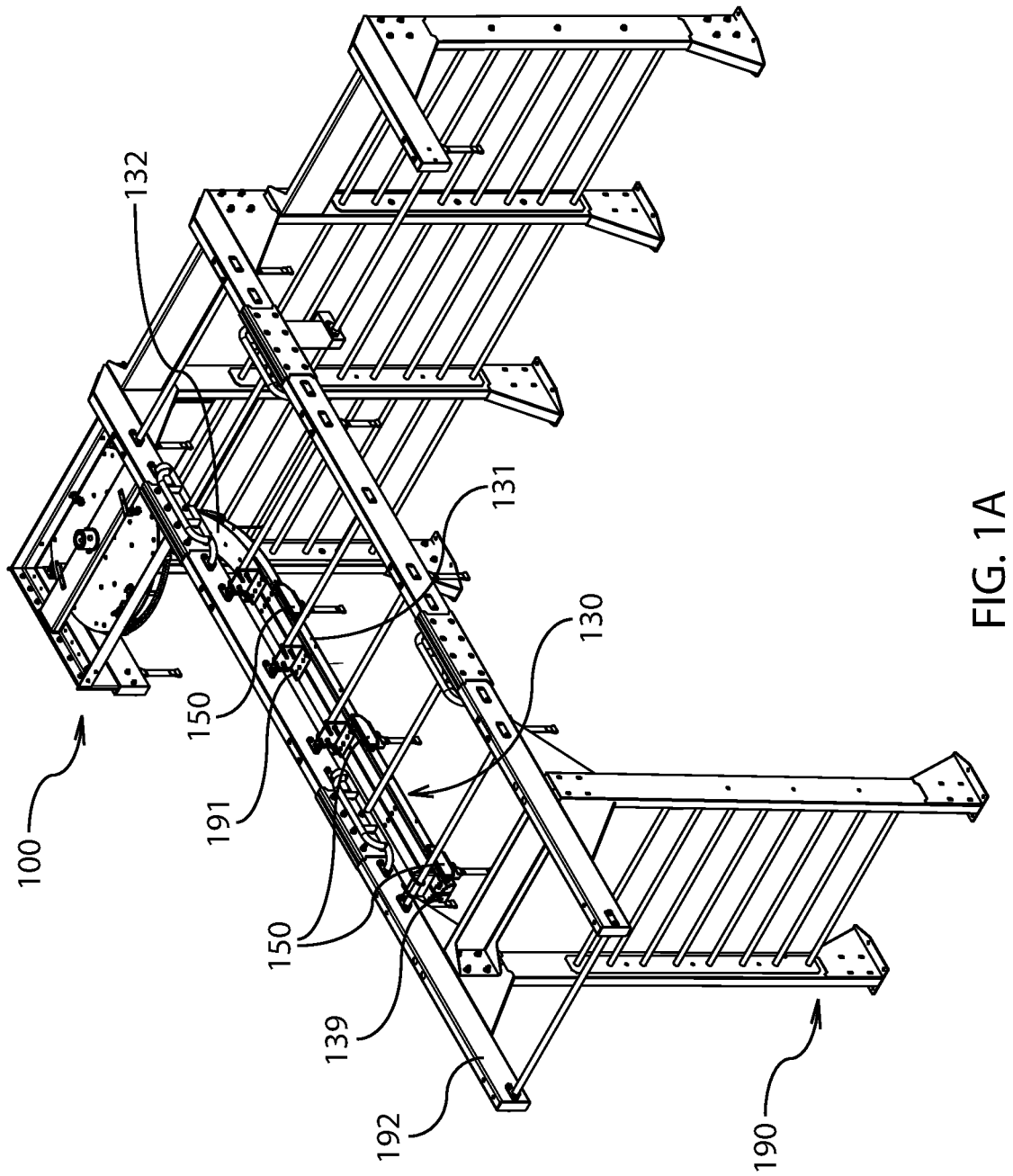
FIG. 1A illustrates an isometric view of an article carousel configured with a track system on a stationary structure.
Figure 1B:
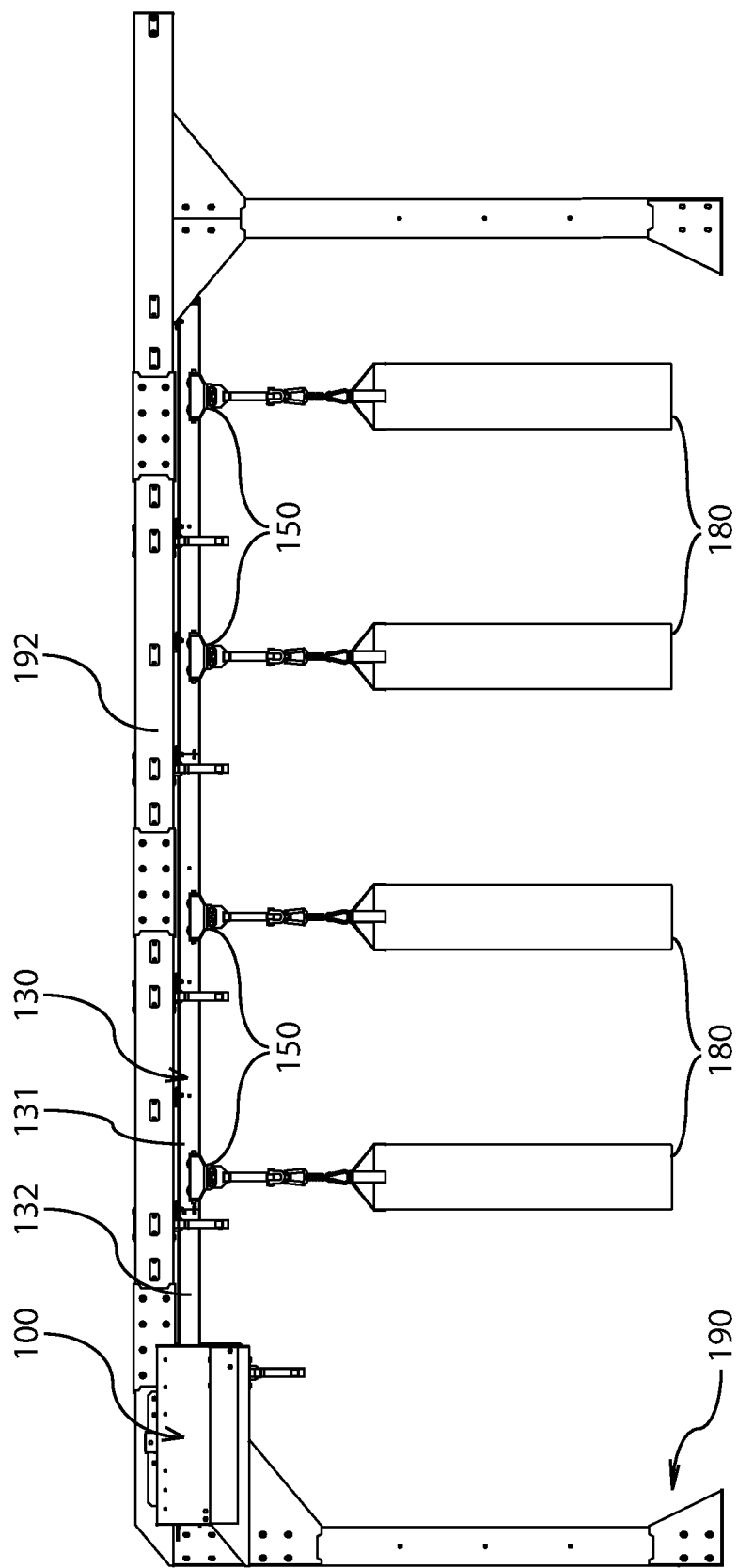
FIG. 1B illustrates a plan view of an article carousel configured with a track system on a stationary structure.

FIG. 1A illustrates an isometric view of a carousel 100 configured with a track system 130 on a stationary structure 190. FIG. 1B illustrates a plan view of carousel 100 configured with track system 130 on stationary structure 190. FIG. 1B further illustrates a number of articles 180 (e.g., punching bags or suspension trainers) secured to track system 130. Carousel 100 and track system 130 may represent an article transfer system. Stationary structure 190 may be configured for attachment of carousel 100 and/or track system 130. Stationary structure 190 may include any number of structural elements 192 (e.g., horizontal elements, vertical elements, or otherwise) to provide strength and/or stability to carousel 100 and/or track system 130.

Carousel 100 and/or track system 130 may be attached to stationary structure 190 or to any suitable support (e.g., beam, ceiling, frame, joist, mount, stand, support, or truss). Carousel 100 and/or track system 130 may be attached directly to stationary structure 190, or may be attached indirectly (e.g., via one or more mounting brackets 191). The attachment of carousel 100, track system 130, stationary structure 190 and/or mounting brackets 191 may be accomplished using fasteners. A person of ordinary skill in the art will appreciate that various fasteners may be suitable for attachment. Fastener should be interpreted broadly, but may include, without limitation, any of an anchor, band, bolt, buckle, button, cam, clamp, clasp, clevis, clip, clutch, cotter, flange, grommet, hook, hook and eye, hook and loop, lag, latch, lip, loop, nail, peg, pin, ring, rivet, screw, snap, staple, stitch, strap, tie, toggle, or zipper.

Each article 180 may be secured indirectly to track system 130 and/or carousel 100 by a trolley 150 (as exemplified in FIG. 1B), nevertheless a person of ordinary skill in the art will appreciate that articles 180 may be attached directly to track system 130 and/or carousel 100 (e.g., using fasteners). Each trolley 150 may be capable of moving along track system 130 and/or carousel 100, and further each article 180 may be capable of moving along track system 130 and/or carousel 100.

Articles 180 may refer to any physical object. For example, and without limitation, articles may refer to punching bags, kicking bags, heavy bags, reflex bags, fitness equipment, any objects moved as part of fitness training, or any combination thereof. Thus, the present disclosure contemplates movement and/or storage of any article where it may be desirable to store articles in a small space, or move articles from one track system 130 to another.

Track system 130 may be configured with a track length, such that articles may be positioned at discrete locations along the track length. Further, track system 130 may be formed by one or more track segments (e.g., track segments 131, 132). The one or more track segments may be linear (e.g., as exemplified by track segment 131), non-linear (e.g., as exemplified by track segment 132), or have both linear and non-linear portions. Track segments 131, 132 may be configured in series (e.g., end-to-end) in order to create a desired track length.

One or more hard stops 139 may be secured to track system 130 (e.g., to the last track segment in a series of track segments) to prevent articles 180 and/or trolleys 150 from rolling off the end of track system 130. In general, it may be understood that track system 130 and/or carousel 100, as exemplified, extend in a substantially horizonal plane. Nevertheless, this disclosure contemplates a track system and/or carousel extending above or below the horizontal plane.

FIG. 2A illustrates an isometric view of a track segment 231. FIG. 2B illustrates a cross-sectional view of the track segment 231. While track segment 231 may be substantially linear, the present disclosure contemplates non-linear track segments (e.g., track segment 132 of FIG. 1A) having the features described with reference to FIGS. 2A and 2B.

Each track segment 231 may include a track attachment portion 233, which may be configured to enable track segment 231 to be attached to a stationary structure (e.g., stationary structure 190 of FIG. 1B). Track attachment portion 233 may be configured with one or more attachment points 234 located along its dimension (e.g., 1, 2, 3, 4, 8, 12, 20, or more attachment points) to facilitate attachment to the stationary structure. The precise number of attachment points 234 may be selected based on loads imposed on track segment 231, convenience of attachment to the stationary structure, or for other design reasons (e.g., standard spacing of attachment points 234 along the dimension). Attachment points 234 may be configured for use with any suitable fastener.

Each track segment 231 may include an article securement portion 235, which may be configured to enable one or more articles (e.g., articles 180 of FIG. 1B) to be secured at discrete locations along track segment 231 (e.g., via a fastener). Alternatively, article securement portion 235 may be configured to enable articles to be moved along the track segment 231 while remaining secured to track segment 231 (e.g., via a trolley).

While track attachment portion 233 and article securement portion 235 may have been described as separate components, the present disclosure contemplates any arrangement where track attachment portion 233 and article securement portion 235 may be separate objects coupled together during manufacture (e.g., via fasteners, welding, or other suitable coupling), or may be part of a unitary object (e.g., formed in a single manufacturing process). Thus, track segment 231 may be formed by any suitable stock material or combination thereof (e.g., I-beam stock, angle stock, channel stock, bar stock, sheet metal and/or tubing stock).

As exemplified in FIG. 2B, track segment 231 may substantially form a "I" shape in cross-section (e.g., two channel stock oriented and attached back to back). The dimensions of the track attachment portion 233 and article securement portion 235 may be similar or different. Yet, the track attachment portion 233 may be configured and optimized for attachment to a stationary structure, whereas the article securement portion 235 may be configured and optimized for securement of one or more articles and/or one or more trolleys (e.g., trolley 350 of FIG. 3A).

Article securement portion 235 may be configured with one or more lock points 236 located along its dimension (e.g., 1, 2, 3, 4, 8, 12, 20, or more lock points) to facilitate securement of the article and/or trolley at discrete positions along the length of track segment 231. The precise number of lock points 236 may be selected based on the number of desired articles to be secured to track segment 231, convenience of selection of article positioning, or for other design reasons (e.g., standard spacing of lock points 236 along the dimension). Lock points 236 may be configured for use with any suitable fastener.

Track segment 231 may include one or more locating tabs 237 at opposing ends of track segment 231, which may facilitate alignment of track segment 231 with another track segment (e.g., track segment 132 of FIG. 1A). Track segments 231 may be aligned and/or attached end-to-end using any one or more of dowels, fasteners, and splines and may take the form of any one or more of box joints, butt joints, dado joints, dovetail joints, edge-to-edge joints, half-lap joints, miter joints, mortise and tenon joints, rabbet joints, sliding joints, and tongue and groove joints.

Figure 3B:
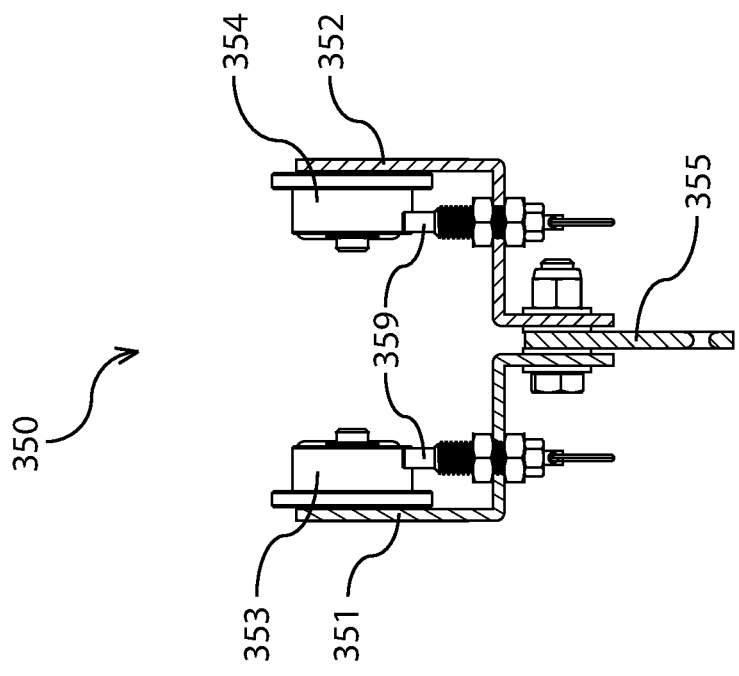
FIG. 3B illustrates a cross-sectional view of a trolley.
Figure 3A:
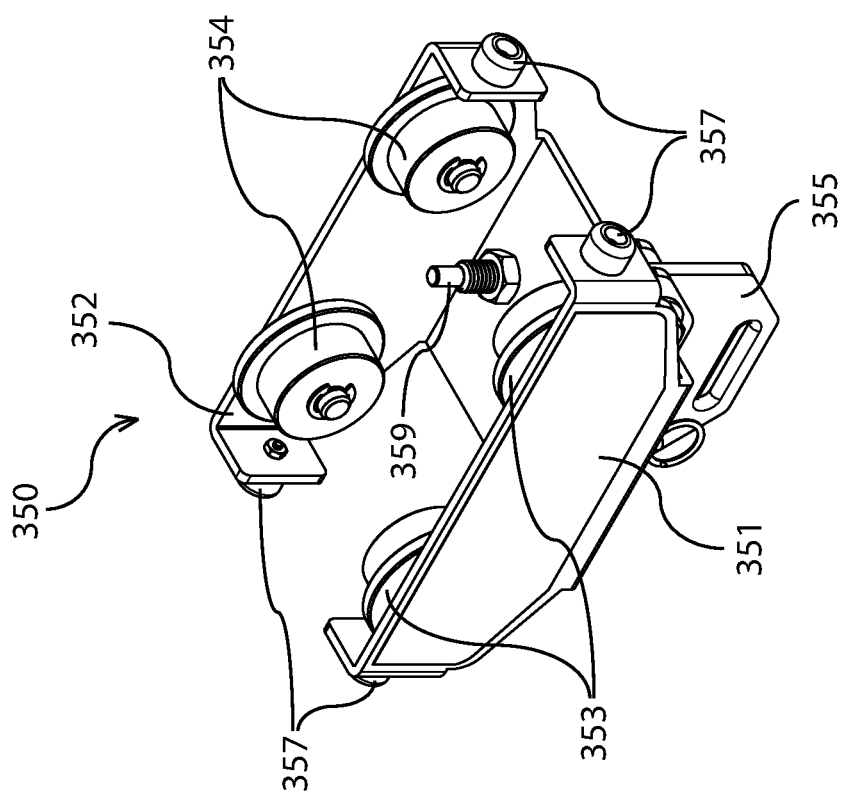
FIG. 3A illustrates an isometric view of a trolley.

FIG. 3A illustrates an isometric view of a trolley 350, configured for use on a track system (e.g., track system 130 of FIG. 1A). FIG. 3B illustrates a cross-sectional view of trolley 350. Trolley 350 may be formed of one or more frame elements (e.g., first and second frame elements 351, 352), one or more rollers (e.g., rollers 353, 354), one or more article brackets (e.g., article bracket 355), one or more bumpers 357, and one or more locking mechanisms 359. Trolley 350 may be configured to secure an article (e.g., article 180 of FIG. 1B) to a carousel and/or track system (e.g., carousel 100 and/or track system 130 of FIG. 1A), and may further allow the article to be moved along the carousel and/or track system.

Generally, the one or more frame elements may be configured so that trolley 350 may be moveable along the track system, but further may be secured against being dislodged from the track system. Therefore, trolley 350 may include a first frame element 351 with one or more rollers 353 secured to the first frame element 351. The one or more rollers 353 may engage an article securement portion of a track segment (e.g., track segment 231 of FIG. 2A) to enable movement of trolley 350 along the track segment.

The one or more rollers 353 may be prevented from being dislodged from the track segment in various ways. The one or more rollers 353 may be shaped to engage with a corresponding shape formed in the article securement portion (e.g., a v-notch or other securing shape). Alternatively, the first frame element 351 may engage with the article securement portion to prevent dislodgement (e.g., via two opposing j-hook shaped elements). Alternatively, a second frame element 352 may be configured with one or more rollers 354 to engage an opposing portion of the article securement portion, such that the first and second frame elements 351, 352 and the one or more rollers 353, 354 may be clamped around the article securement portion (e.g., as exemplified in FIG. 4A).

One or more article brackets may be attached to the first frame element 351, the second frame element 352, or both. Alternatively, each of the first and second frame elements 351, 352 may be secured to opposing sides of an article bracket 355 (e.g., via a fastener). One or more articles (e.g., article 180 of FIG. 1B) may be attached to article bracket 355. Each article may be removably or permanently attached to bracket 355 (e.g., via fasteners).

One or more bumpers 357 may be attached to the first frame element 351, the second frame element 352, or both. Bumpers 357 may be attached forwardly or rearwardly on trolley 350, and further may extend beyond every other element of trolley 350, such that during movement of trolley 350 bumpers 357 will be contacted first by any object in the path of trolley 350. Bumpers 357 may prevent trolley 350 from slamming into a hard stop (e.g., hard stop 139 of FIG. 1A) and/or adjacent trolleys and may reduce the noise generated during such contact and/or reduce wear on trolley 350.

Locking mechanisms 359 (e.g., a spring plunger) may be attached to the first frame element 351, the second frame element 352, or both. Locking mechanisms 359 may extend from trolley 350 toward the article securement portion (e.g., article securement portion 435 of FIG. 4A) and further may engage the article securement portion to cause trolley 350 to be secured against movement along the track segment. While locking mechanisms 359 have been exemplified as substantially vertical, other configurations may be contemplated by the present disclosure.

Figure 4A:
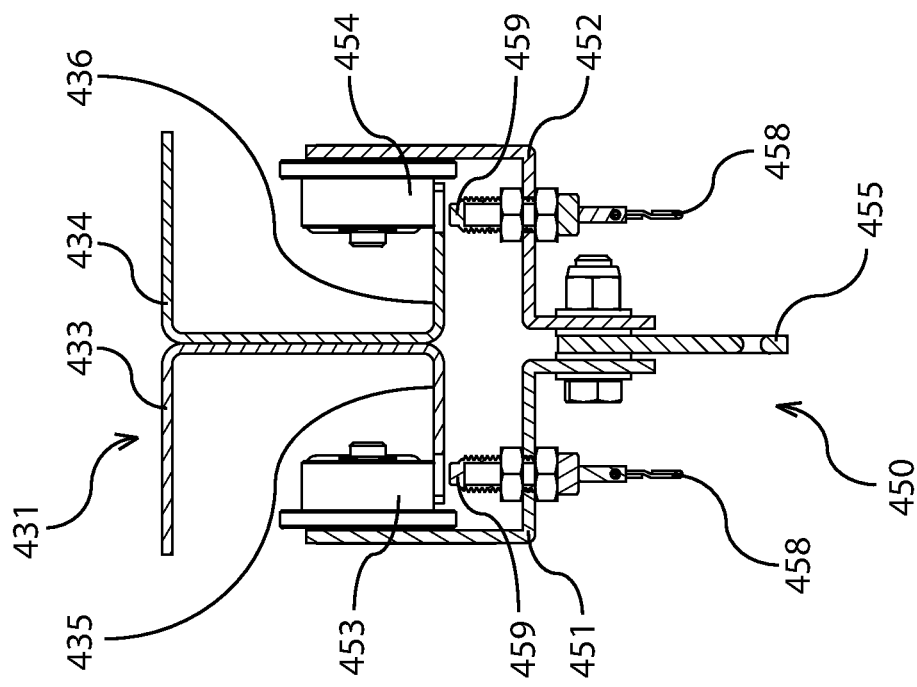
FIG. 4A illustrates a cross-sectional view of a trolley configured on a track segment.
Figure 4B:
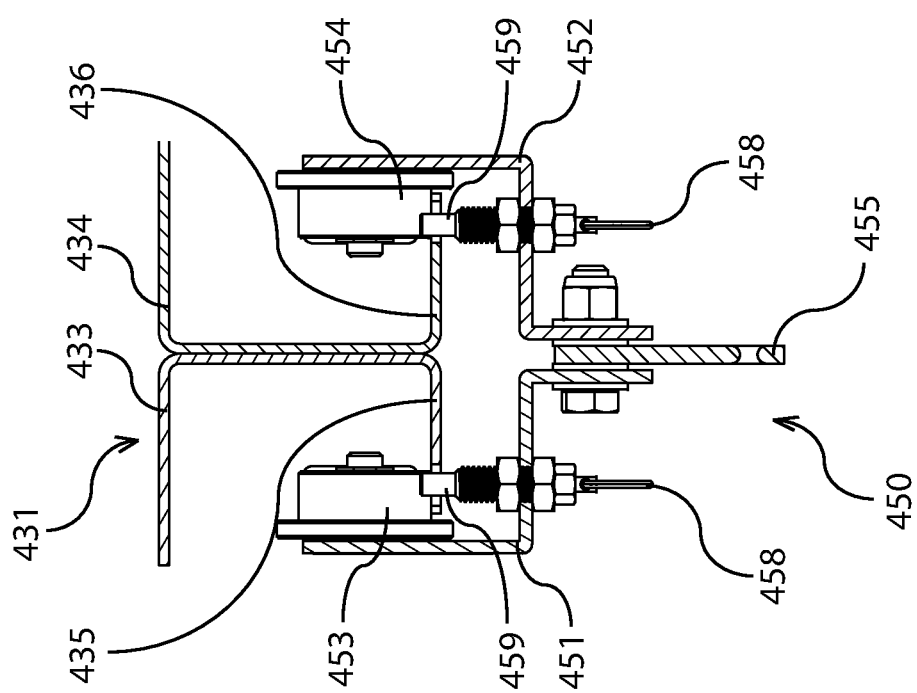
FIG. 4B illustrates a cross-sectional view of a trolley configured on a track segment.

FIG. 4A illustrates a cross-sectional view of a trolley 450 configured on a track segment 431 (e.g., in a first operable condition). FIG. 4B illustrates a cross-sectional view of trolley 450 configured on track segment 431 (e.g., in a second operable condition). Track segment 431 may be formed by one or more track attachment portions (e.g., first and second track attachment portions 433, 434) and one or more article securement portions (e.g., article securement portions 435, 436).

Trolley 450 may be formed of one or more frame elements (e.g., first and second frame elements 451, 452), one or more rollers (e.g., rollers 453, 454), one or more article brackets (e.g., article bracket 455), and one or more locking mechanisms 459. Trolley 450 may be configured to secure an article (e.g., article 180 of FIG. 1B) to a carousel and/or track system (e.g., carousel 100 and/or track system 130 of FIG. 1A), and may further allow the article to be moved along the carousel and/or track system.

A first frame element 451 with one or more rollers 453 may be configured to engage a first article securement portion 435 of track segment 431 to enable movement of trolley 450 along the track segment. Further a second frame element 452 with one or more rollers 454 may be configured to engage a second article securement portion 436 of track segment 431 to enable movement of trolley 450 along the track segment. In addition to one or more rollers configured above first and second article securement portions 435, 436, the present disclosure contemplates one or more rollers configured on first and/or second frame elements 451, 452 below first and second article securement portions 435, 436, which may add stability and/or prevent misalignment of trolley 450 during loading in the exemplified or other than downward directions.

Article bracket 455 may be secured to one or both of the first and second frame elements 451, 452, and further may extend in a direction toward the intended load (e.g., where one or more articles may be hung from trolley 450, article bracket 455 may extend downwardly, as exemplified in FIGS. 4A and 4B). The present disclosure contemplates alternative configurations of the article bracket 455 which may facilitate attachment of articles as exemplified or in other than downward directions.

Locking mechanisms 459 (e.g., a spring plunger) may be attached to one or both of the first and second frame elements 451, 452. Locking mechanisms 459 may be movable between two operable conditions. In a first operable condition, locking mechanisms 459 may be extended (e.g., as exemplified in FIG. 4A). During the first operable condition, locking mechanisms 459 may extend from trolley 450 toward corresponding first and second article securement portions 435, 436 to engage the article securement portions 435, 436 (e.g., extending into lock points 236 of FIG. 2A). Thus, in the first operable condition, trolley 450 may be secured against movement along track segment 431. In a second operable condition, locking mechanisms 459 may be retracted (e.g., as exemplified if FIG. 4B). During the second operable condition, locking mechanisms 459 may retract from first and second article securement portions 435, 436, and/or may disengage from first and second article securement portions 435, 436. Thus, in the second operable condition, trolley 450 may be secured to track segment 431 but free to move along track segment 431 (e.g., along the track length of track system 130 of FIG. 1A).

An engagement ring 458 may be configured at an opposing end of locking mechanism 459 to enable user engagement with locking mechanism 459. Locking mechanism 459 may be biased into the first position (e.g., via an internal spring, compliant mechanism, or other biasing element). A user may interact with the engagement ring 458 (e.g., by pulling it downward) to cause the locking mechanism 459 to move from the first position to the second position. While engagement ring 458 may be illustrated as having a ring-like structure, this disclosure contemplates any structure which enables the user to interact with the locking mechanism 459 (e.g., such as a draw string, pull cord, lever, rod or other mechanical actuator). Further locking mechanisms 459 may be bi-modal, and/or capable of two or more stable positions.

Figure 5A:
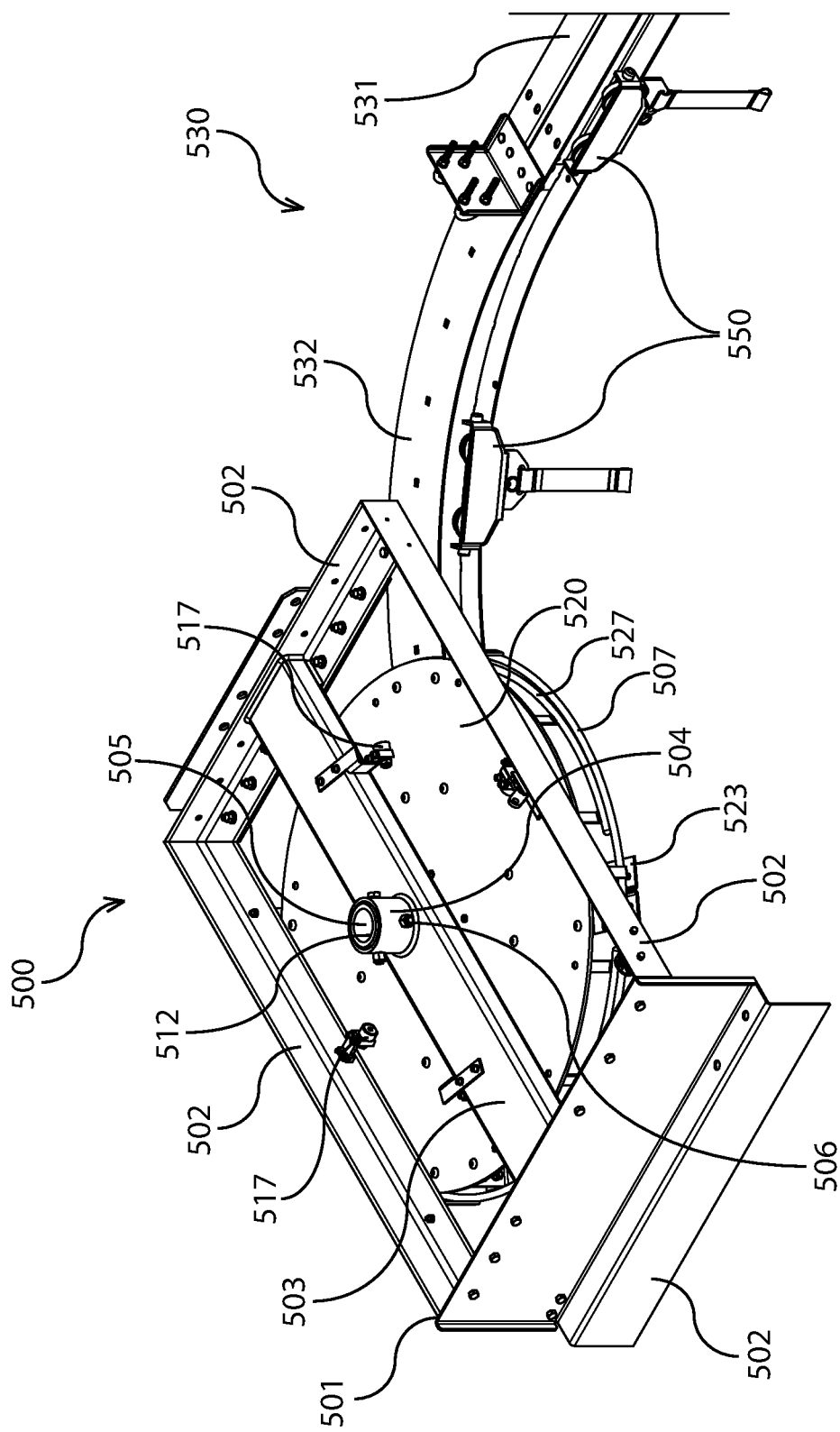
FIG. 5A illustrates an isometric view of an article carousel configured with a track system.
Figure 5B:
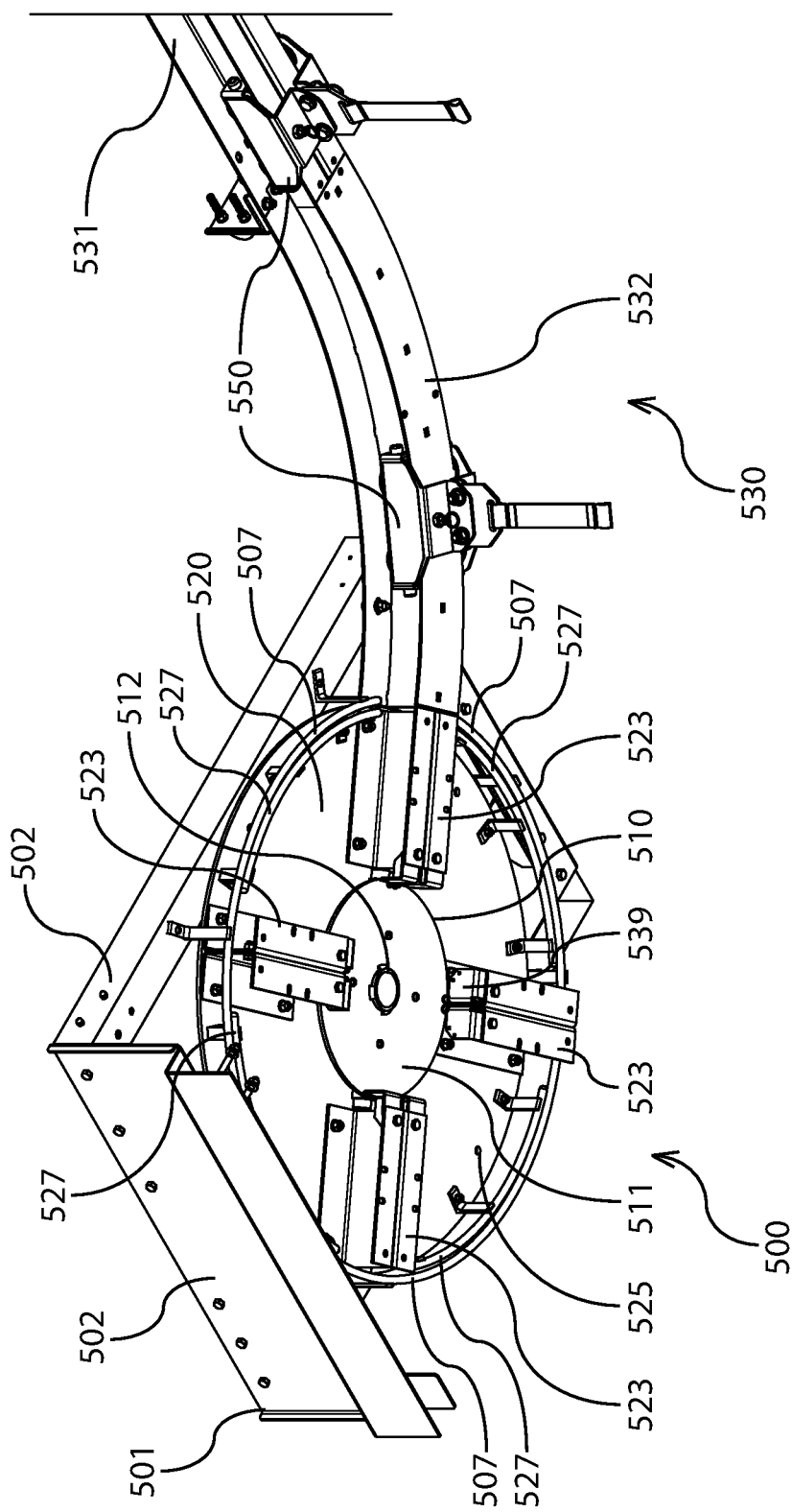
FIG. 5B illustrates an isometric view of an article carousel configured with a track system.

While the trolley 450 has primarily been discussed as interacting with a track system and/or a track segment, the present disclosure contemplates interaction with a carousel (e.g., carousel 500 of FIGS. 5A and 5B). Thus, a carrier (e.g., carrier 523 of FIG. 5B) may be configured with geometry and/or features substantially similar to the track system and/or track segment 431 (e.g., having similar geometry and/or features as disclosed with respect to track segment 231 of FIG. 2A), such that trolley 450 may be moveable from the track system and/or track segment 431 to a corresponding structure of the carousel (e.g., having one or more track attachment portions and/or one or more article securement portions of substantially similar geometry to track segment 431).

Figure 5C:
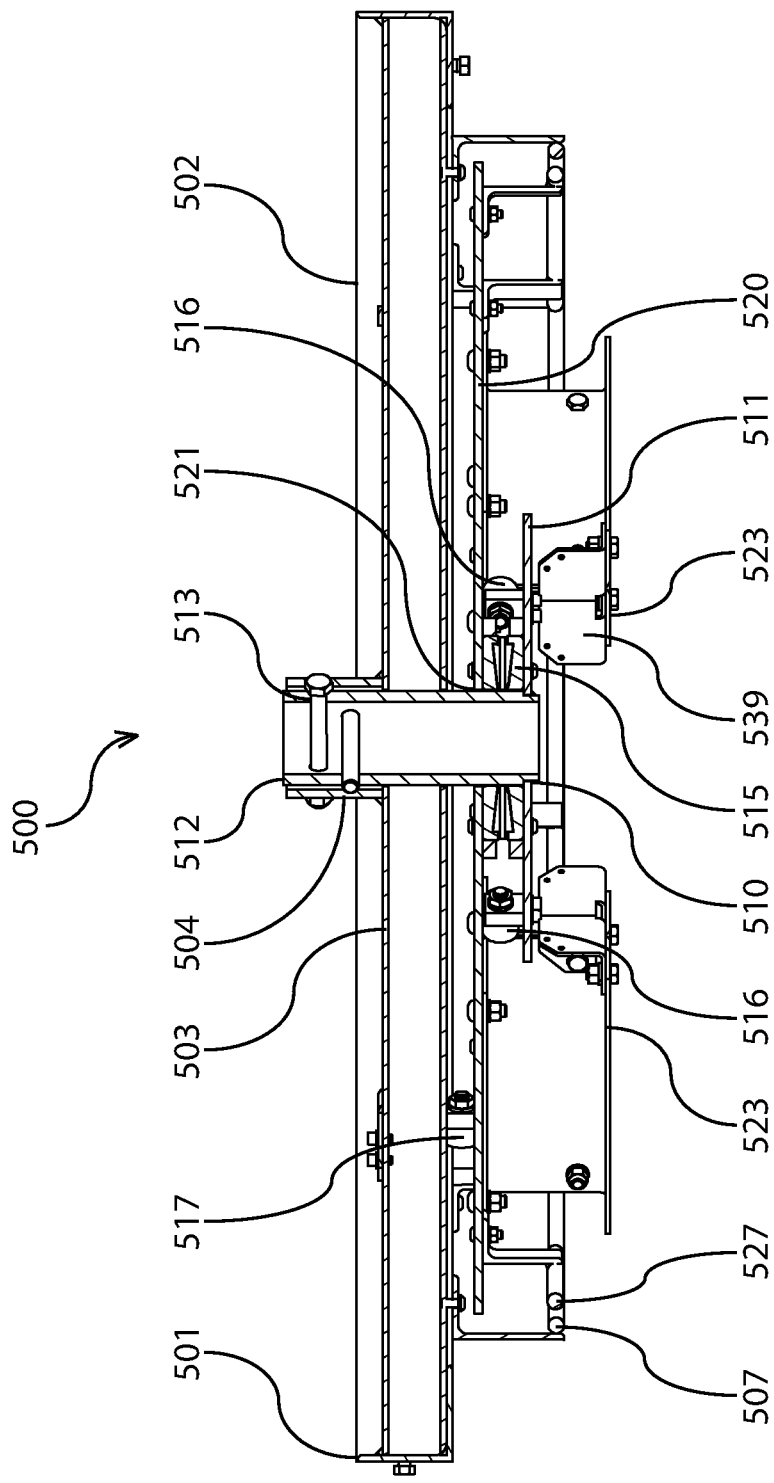
FIG. 5C illustrates a cross-sectional view of an article carousel.

FIG. 5A illustrates an isometric view of a carousel 500 configured with a track system 530 as viewed from above. FIG. 5B illustrates an isometric view of carousel 500 with track system 530 as viewed from below. FIG. 5C illustrates a cross-sectional view of carousel 500. Carousel 500 may be discussed with or without particular reference to each of these figures as appropriate in order to understand the components which may be best illustrated in each figure. Generally, carousel 500 may be configured to receive one or more articles (e.g., articles 180 of FIG. 1B) and/or trolleys 550, such as to facilitate removal of the articles and/or trolleys 550 from track system 530.

Carousel 500 may include a frame 501, a storage track 510, and a plate 520. Frame 501 may be configured with one or more perimeter supports 502 configured for mounting carousel 500 to a stationary structure (e.g., stationary structure 190 of FIG. 1B). Perimeter supports 502 may extend around an outer perimeter of carousel 500. Frame 501 may be configured with a central support 503 substantially running through a center of frame 501. Central support 503 may be attached to one or more of perimeter supports 502. Frame 501 may be configured with a cylinder 504 positioned substantially centrally in frame 501. Cylinder 504 may be attached to central support 503 (e.g., substantially at a midpoint of central support 503). A bore hole 505 may extend through frame 501 such that bore hole 505 may extend through cylinder 504 and/or central support 503. Bore hole 505 may be configured to receive and/or retain storage track 510. One or more pin holes 506 may extend through a sidewall of cylinder 504 to retain storage track 510.

Storage track 510 may be formed by a retaining plate 511 and a shaft 512 attached to retaining plate 511 (e.g., via fasteners) and extending substantially upward from retaining plate 511. Storage track 510 may be configured to attach to frame 501. One or more pin holes 513 may extend through a sidewall of shaft 512 for retaining storage track 510. Shaft 512 may be configured to extend into and/or through cylinder 504 and shaft 512 may be attached to cylinder 504 (e.g., via fasteners extending through pin holes 506, 513).

Plate 520 may be retained by storage track 510 in carousel 500. Plate 520 may be configured with a central hole 521 (e.g., positioned substantially centrally within plate 520), such that shaft 512 may extend through central hole 521 before attachment of shaft 512 to frame 501. Thus, plate 520 may be retained between storage track 510 and frame 501. While plate 520 and storage track 510 may be exemplified in FIGS. 5A and 5B as circular plates (e.g., a plate-on-plate configuration), plate 520 and storage track 510 may be configured in any of a number of moveable relationships.

Plate 520 and storage track 510 may take the form of an outer cylinder capable of rotation about a stationary inner cylinder (e.g., a cylinder-in-cylinder configuration), and may have one or more carriers 523 interconnected with the rotatable outer cylinder by means of a support member (not shown) to provide adequate spacing and strength. Further, plate 520 and storage track 510 may take the form of cones, cylinders, plates, spheres, other useful three-dimensional shapes, or any combination thereof.

Plate 520 may be configured to retain one or more articles directly or indirectly (e.g., via one or more trolleys 550). One or more trolleys 550 may be retained by one or more carriers 523 attached to the underside of plate 520 (e.g., via fasteners). Carriers 523 may bear a substantial similarity to track segments 531, 532 (e.g., having a substantially similar cross-section and/or including one or more hard stops 539). Carriers 523 may be dimensioned to enable trolleys 550 to move completely off track system 530 and completely onto carriers 523 during alignment of carriers 523 with one or more track segments 531, 532. Track system 530 may include any number of straight track segments 531 (e.g., 1, 2, 3, 4, 5, 6, 7, 8, or more), and/or curved track segments 532 (e.g., 1, 2, 3, 4, 5, 6, 7, 8, or more).

Carriers 523 may be configured around an outer perimeter of plate 520. As exemplified in FIG. 5B, carousel 500 may include four carriers 523, though more or less carriers 523 may be contemplated by the present disclosure (e.g., 1, 2, 3, 4, 8, 12, 20, or more carriers 523). The precise number of carriers 523 may be selected based on the number of desired articles and/or trolleys 550 to be secured to carousel 500, the size of each article, the weight of each article, the proximity of each carrier 523, or for other design reasons (e.g., articles of a particular size or weight may warrant adequate spacing of the carriers 523).

Further, plate 520 may be configured for movement with respect to storage track 510 and frame 501. Movement of plate 520 may be restricted to a single degree of freedom (e.g., a rotational degree of freedom about a vertical axis). The present disclosure contemplates restriction of movement to a single translational degree of freedom. Movement of plate 520 may be facilitated by one or more friction reducing elements (e.g., bearings, rollers, cam surfaces, races, and/or journals).

A first friction reducing element 515 (e.g., a thrust bearing) may be configured between plate 520 and storage track 510 (e.g., adjacent shaft 512). One or more second friction reducing elements 516 (e.g., rollers) may extend from storage track 510 and further may contact plate 520 (e.g., adjacent an outer perimeter of storage track 510). One or more third friction reducing elements 517 (e.g., rollers) may extend from frame 501 and further may contact plate 520 (e.g., adjacent an outer perimeter of plate 520). Any one or more of the first, second and third friction reducing elements may be configured to hold the weight of and/or stabilize plate 520 (e.g., extending downwardly to engage a top surface, extending upwardly to engage a bottom surface, or both, to engage plate 520), one or more carriers 523 attached to plate 520, one or more trolleys 550 secured to carriers 523 and/or one or more articles attached to trolleys 550.

Movement of plate 520 may enable alignment of each carrier 523 with track system 530. Where the degree of freedom provided for may be rotational, plate 520 may rotate such that each carrier 523 may be aligned with track system 530 at least once during such rotation (e.g., and in a non-alignment orientation at other angles). Where the degree of freedom provided for may be translational (not shown), plate 520 may translate such that each carrier 523 may be aligned with track system 530 at least once during such translation (e.g., and in a non-alignment orientation at other positions). While FIG. 5B exemplifies each carrier 523 as being capable of carrying at least one trolley 550, this disclosure contemplates carriers capable of carrying more than one trolley 550 (e.g., 2, 3, 4, 5, 6, 7, 8, or more trolleys 550).

Plate 520 may be configured with one or more lock points 525 located along its dimension (e.g., 1, 2, 3, 4, 5, 6, 7, 8, or more lock points). Lock points 525 may facilitate locking of plate 520 with respect to frame 501 and/or storage track 510 (e.g., to prevent movement in the degree of freedom otherwise provided for). The precise number of lock points 525 may be selected based on the number of desired articles to be secured to carousel 100, convenience of alignment of each carrier 523 with track system 530, or for other design reasons (e.g., standard spacing of lock points 525 along the dimension). Lock points 525 may be positioned to facilitate alignment, and may be positioned such that during use of a particular lock point 525 a corresponding carrier 523 is in alignment with the track system 530.

While a second track system may not be exemplified in FIGS. 1, 5A, or 5B, a person of ordinary skill in the art will appreciate that track system 530, or an equivalent track system, may be reproduced at another position in alignment with one of carriers 523. Thus, alignment of a first carrier 523 with track system 530 may be simultaneous or non-simultaneous with alignment of a second carrier 523 with another track system (not shown). Further, any number of additional track systems (e.g., 1, 2, 3, 4, 5, 6, 7, 8, or more) may be configured for simultaneous or non-simultaneous alignment with any number of carriers 523.

During loading of carousel 500, alignment of track system 530 with a first carrier 523 may enable a first trolley 550 to be moved from track system 530 to the first carrier 523. Plate 520 may be rotated until alignment of track system 530 with a second carrier 523. During alignment of the second carrier 523 with track system 530 a second trolley 550 may be moved from track system 530 to the second carrier 523. This process may be repeated until all carriers 523 may be occupied by a trolley 550. Further, this process may be reversed, such that trolleys 550 may be moved from each carrier 523 onto track system 530.

Carousel 500 may include one or more barriers (e.g., exit barrier 507 and/or entrance barriers 527) to ensure trolleys 550 do not roll off of, or otherwise detach from carriers 523 and/or track system 530. Exit barrier 507 may extend from frame 501 (e.g., fixed in place, such as by brackets) such that the entire perimeter of plate 520 may be guarded by exit barrier 507 except that an opening may be formed where track system 530 comes into alignment with carriers 523 (as exemplified in FIG. 5B). Thus, trolleys 550 may be prevented from exiting carriers 523 by hard stops 539 on one side of carriers 523 and may further be prevented from exiting carriers 523 by exit barrier 507. This disclosure contemplates additional openings in exit barrier 507 for alignment with additional track systems as further described herein.

One or more entrance barriers 527 may extend from plate 520 (e.g., moving with plate 520) around the perimeter of plate 520 such that the perimeter of plate 520 may be guarded by the one or more entrance barriers 527 except that an opening may be formed at each carrier 523. Thus, trolleys 550 may be prevented from entering carousel 500 except when carriers 523 may be in alignment with track system 530. The exit barrier 507 and entrance barriers 527 together may prevent trolleys 550 from rolling off of track system 530 and/or carousel 500 during movement of trolleys 550.

Figure 6:
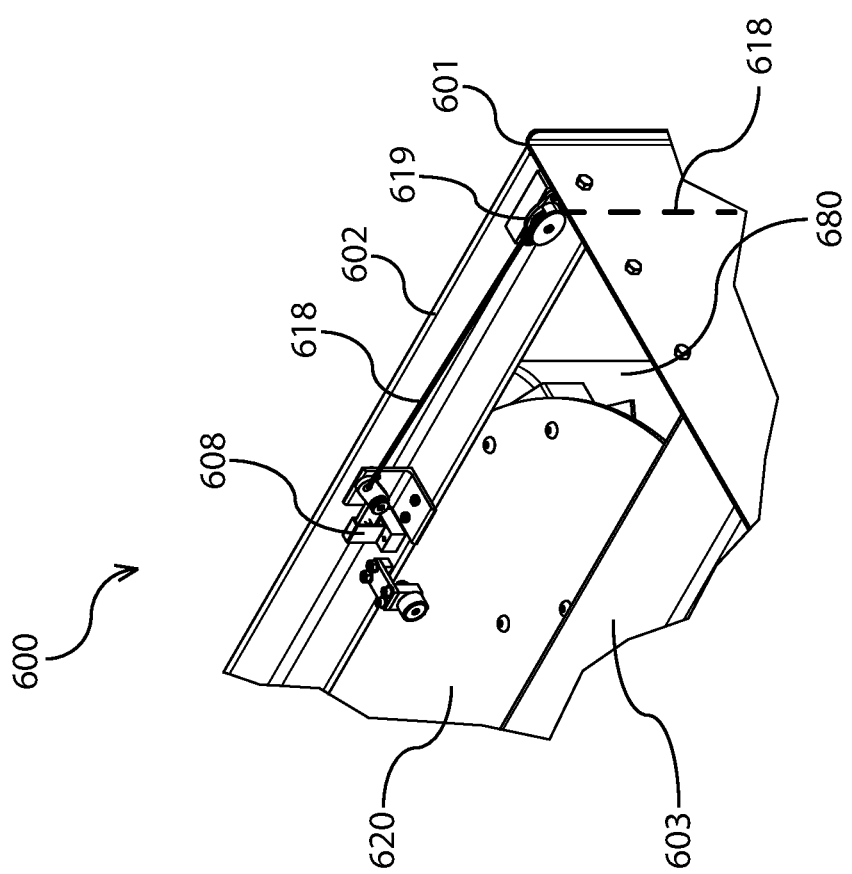
FIG. 6 illustrates an isometric view of a carousel pully latch configured on a carousel.

FIG. 6 illustrates an isometric view of a carousel pulley latch 608 configured on a carousel 600 (only a portion of carousel 600 may be illustrated in FIG. 6). Carousel 600 may include a frame 601, a storage track (e.g., storage track 510 of FIG. 5B), and a plate 620 configured for movement with respect to frame 601. Movement of plate 620 may be restricted to one degree of freedom (e.g., a rotational degree of freedom).

Carousel latch 608 (e.g., a spring lever) may be attached to frame 601 (e.g., to a perimeter support 602, as exemplified, or a central support 603 of frame 601). Carousel latch 608 may be moveable between two operable conditions. In a first operable condition, carousel latch 608 may be extended (e.g., as exemplified in FIG. 6). During the first operable condition, carousel latch 608 may extend from frame 601 toward plate 620 to engage plate 620 (e.g., extending into lock points 525 of FIG. 5B). Thus, in the first operable condition, plate 620 may be secured against movement with respect to the degree of freedom provided for.

In a second operable condition, carousel latch 608 may be retracted (not shown). During the second operable condition, carousel latch 608 may retract from plate 620, and/or may disengage from lock points of plate 620 (e.g., lock points 525 of FIG. 5B). Thus, in the second operable condition, plate 620 may be free to move with respect to the degree of freedom provided for (e.g., rotationally about a vertical axis).

An engagement member 618 may be configured to enable user engagement with carousel latch 608. Carousel latch 608 may be biased (e.g., into the first position via an internal spring, compliant mechanism, or other biasing element). A user may interact with engagement member 618 by applying a force to engagement member 618 (e.g., by pulling engagement member 618 directionally) to cause the carousel latch 608 to move from the first position to the second position. While engagement member 618 may be illustrated as having a string-like structure, this disclosure contemplates any structure which enables the user to interact with the engagement member 618 (e.g., such as a draw string, pull cord, lever, rod, or other mechanical actuator).

One or more translating mechanisms 619 (e.g., pulleys, levers, rods, rope, strap and/or mechanical actuators) may be configured to translate engagement member 618 to a position having more convenient access by the user (e.g., outside the perimeter of plate 620, near an outer perimeter of frame 601 and/or substantially away from articles 680, whether attached to plate 620 or attached elsewhere).

Figure 7:
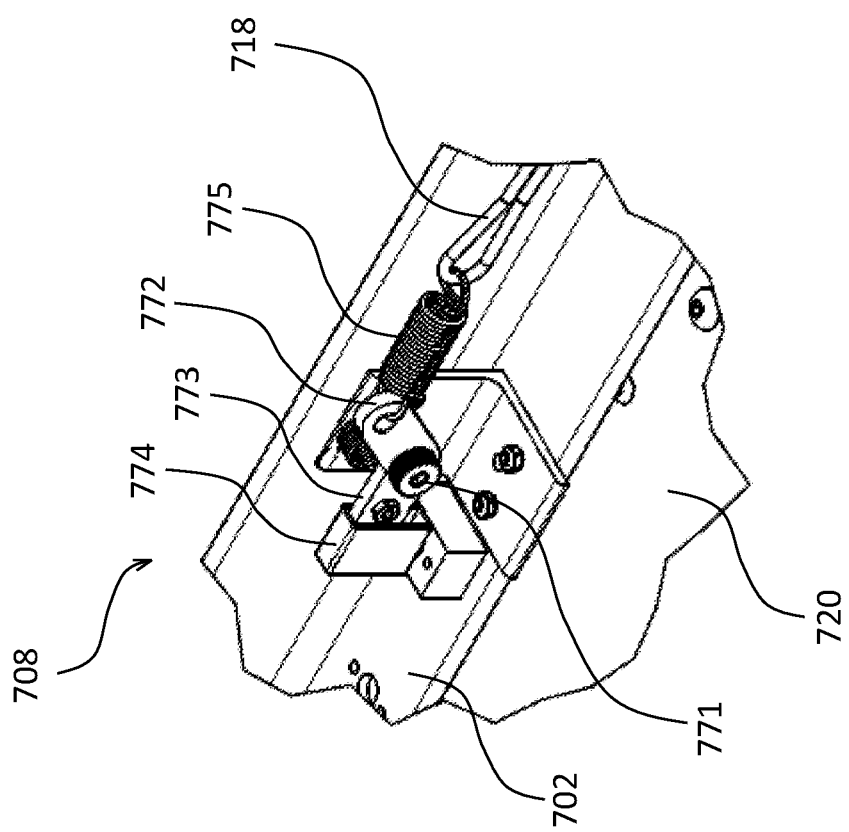
FIG. 7 illustrates an isometric view of a carousel latch configured on a structural element.

FIG. 7 illustrates an isometric view of a carousel latch 708 configured on a carousel, such as on a perimeter support 702 of a carousel (only a portion of perimeter support 702 may be illustrated in FIG. 7). Perimeter support 702 may be positioned above a plate 720 configured for movement with respect to perimeter support 702. Movement of plate 720 may be restricted to one degree of freedom (e.g., a rotational degree of freedom).

Carousel latch 708 (e.g., a spring actuated, translatable pin) may be attached to perimeter support 702. Carousel latch 708 may be moveable between two operable conditions. In a first operable condition, carousel latch 708 may be extended (e.g., as exemplified in FIG. 7). During the first operable condition, carousel latch 708 may extend from perimeter support 702 toward plate 720 to engage plate 720 (e.g., such that a translatable pin extends into lock points 525 of FIG. 5B). Thus, in the first operable condition, plate 720 may be secured against movement with respect to the degree of freedom provided for.

In a second operable condition, carousel latch 708 may be retracted (not shown). During the second operable condition, carousel latch 708 may be engaged by a user applying a force on an engagement member 718 (e.g., such as a pull cord). Movement of engagement member 718 may cause a corresponding movement of carousel latch 708, such as rotation of carousel latch 708 about a center of rotation 771.

Carousel latch 708 may have one or more arms (e.g., first arm 772 and second arm 773) which are formed integrally or secured from movement with respect to each other. Engagement member 718 may be secured to first arm 772, such that movement of engagement member 718 may cause a corresponding movement of first arm 772 (e.g., a rotational movement about center or rotation 771). The connection point of engagement member 718 with first arm 772 may be positioned and oriented at a distance from center of rotation 771 to maximize the mechanical advantage of movement of first arm 772. Further, movement of engagement member 718 may cause a corresponding movement of second arm 773 (e.g., a rotational movement about center or rotation 771). The connection point of engagement member 718 with second arm 773 may be positioned and oriented at a distance from center of rotation 771 to maximize the mechanical advantage of movement of second arm 773.

Second arm 773 may be connected to a pin assembly 774 (e.g., a rotational, sliding, or other connection) which is constructed to engage with plate 720. Thus, movement of second arm 773 may cause a corresponding movement of pin assembly 774 to extend into plate 720 (e.g., the first operable condition) or retract from plate 720 (e.g., the second operable condition). Thus, the mechanical advantage of second arm 773 may be optimized for movement of pin assembly 774. Pin assembly 774 may engage with, or disengage from plate 720 at one or more discrete locations along plate 720 (e.g., lock points 525 of FIG. 5B). Thus, in the second operable condition, plate 620 may be free to move with respect to the degree of freedom provided for (e.g., rotationally about a vertical axis).

Engagement member 718 may be secured directly to carousel latch 608, or indirectly by means of dampener (e.g., spring 775). During operation, a user may interact with engagement member 718 by applying a force to engagement member 718 (e.g., by pulling engagement member 718 directionally) to cause the carousel latch 708 to move from the first position to the second position. Inclusion of a dampener may enable a greater range of motion of engagement member 718 during force application by a user, and may provide other advantages as would be known to a person of ordinary skill in the art.

Figure 8A:
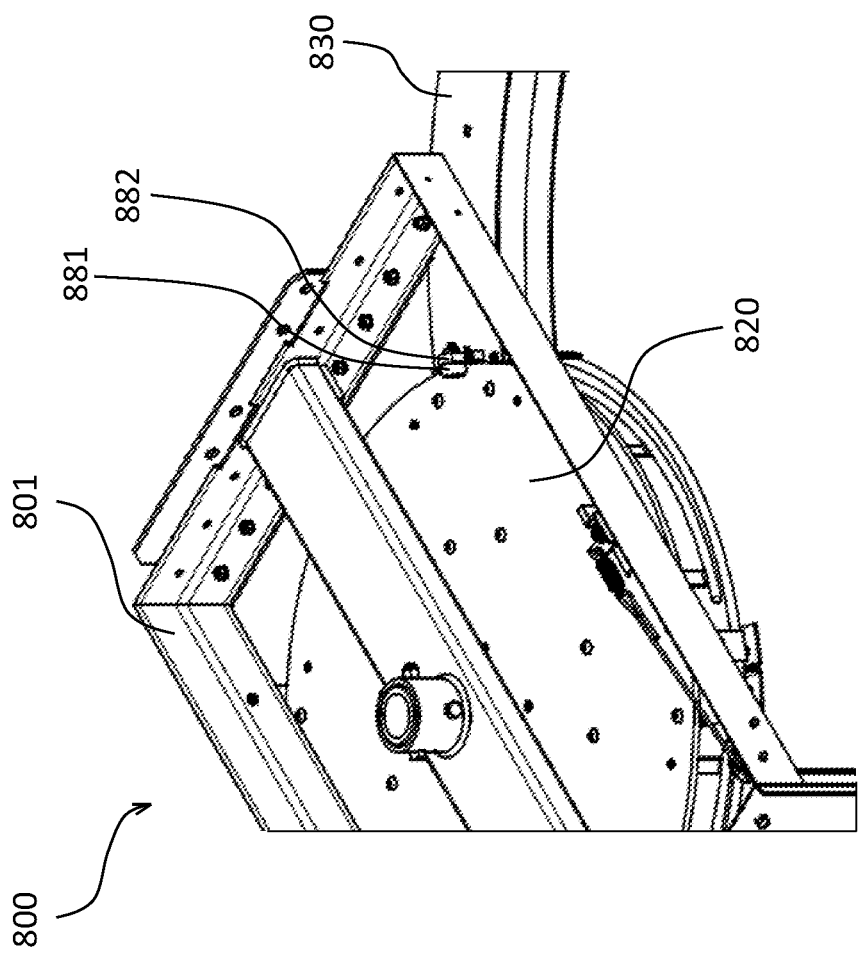
FIG. 8A illustrates an isometric view of a portion of an article carousel configured with a track system.
Figure 8B:
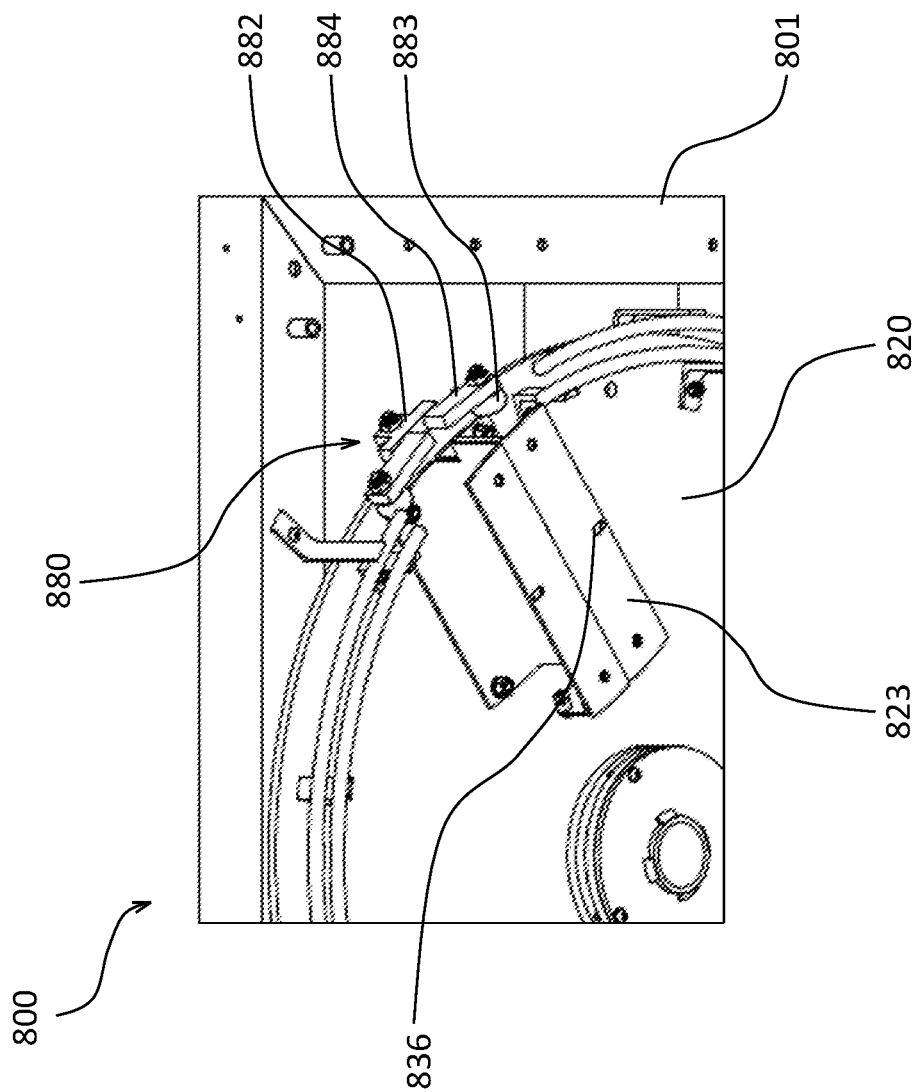
FIG. 8B illustrates an isometric view of a portion of an article carousel.

FIG. 8A illustrates an isometric view of a portion of a carousel 800 configured with a track system 830 as viewed from above. FIG. 8B illustrates an isometric view of the carousel 800 as viewed from below with the track system 830 removed for convenience. Generally, carousel 800 may be configured to receive one or more articles (e.g., articles 180 of FIG. 1B) and/or trolleys (e.g., trolleys 550 of FIG. 5B).

Carousel 800 may include any one or more of the features disclosed with respect to other figures of the present disclosure, and further may include a frame 801 and a plate 820 configured for movement (e.g., rotational movement) relative to frame 801 and/or track system 830. A carrier 823 may be attached to plate 820 (e.g., near an outer perimeter of plate 820), such that during movement of plate 820 carrier 823 is capable of moving into and/or out of alignment with track system 830 (e.g., as illustrated in FIG. 5B). Further, carrier 823 may have a similar construction to track system 830 (e.g., having a substantially similar cross-section and/or dimensions), such that a trolley can move onto carrier 823 from track system 830, or onto track system 830 from carrier 823, during alignment of carrier 823 with track system 830.

Plate 820 may be retained as described in this disclosure, and further may be stabilized by one or more friction reducing elements (e.g., friction reducing elements 515, 516, 517 of FIGS. 5A and 5C). Where carousel 800 is burdened with carrying only a carrier 823, or a plurality of carriers (e.g., as illustrated in FIG. 5B), stabilization may be achieved as disclosed herein. Where carousel 800 is burdened with substantially higher loads, such as articles of significantly higher weight suspended from carousel 800 or carrier 823, additional stabilization features may be necessary to ensure adequate alignment of carrier 823 with track system 830. Thus, track system 830 may be equipped with a carrier alignment system 880. Carrier alignment system 880 may extend above and/or below plate 820 to facilitate retention of plate 820 and/or alignment of carrier 823 with track system 830.

Carrier alignment system 880 may include at least one friction reducing element 881 (e.g., a cam follower) which contacts the upper surface of plate 820. An upper support arm 882 may extend between friction reducing element 881 and track system 830 to secure friction reducing element 881 against the upper surface of plate 820. Carrier alignment system 880 may further include at least one friction reducing element 883 (e.g., a cam follower) which contacts the lower surface of plate 820. A lower support arm 884 may extend between friction reducing element 883 and track system 830 to secure friction reducing element 883 against the lower surface of plate 820.

While only a single upper support arm 882 and two lower support arms 884 are illustrated in FIG. 8B, a person of ordinary skill in the art will appreciate that any number of support arms may be configured on track system 830 to support plate 820 and/or retain in alignment carrier 823 (e.g., 1 upper and 1 lower, 2 uppers and 1 lower, 2 uppers and 2 lowers, or more). Furthermore, while carrier alignment system 880 appears to be "floating" in FIG. 8B, it is understood that upper and lower supports are secured to track system 830 in a manner known in the art and which would be capable of holding the weight of at least one and/or several articles whose weight is entirely suspended from plate 820 and/or track system 830.

Carrier 823 may include one or more lock points 836 for retaining the trolley on carrier 823 (e.g., locking mechanisms 359 of FIG. 3B may be configured to engage with lock points 836).

In general, during use of the article carousel and track system as represented in any of the foregoing illustrations, it is understood that articles secured to each trolley may be usable for a particular purpose. The present invention therefore provides a convenient way to move and retain articles during use and to move and retain articles during nonuse (e.g., for storage). For exceedingly large and/or heavy articles, the present invention makes movement and retention simpler, easier, and less likely to result in injury to the person who moves the articles. Furthermore, articles may be prepared for use and/or stored quickly in order to facilitate activities which either do or do not require use of the articles.

Other aspects will be apparent to those skilled in the art from consideration of the specification and practice disclosed herein. It is intended, therefore, that the specification and illustrated embodiments be considered as examples only.

What is claimed is:
1. A method of operating an article transfer system having a track system and a carousel, the carousel having frame, a plate configured for movement with respect to the frame, one or more carriers attached to the plate, and one or more trolleys configured on one or both of the track system and the one or more carriers, the method comprising:
configuring the carousel such that the one or more carriers may each align with the track system during movement of the plate;
aligning a first of the one or more carriers with the track system by moving the plate; and
transferring the one or more trolleys between the track system and the first of the one or more carriers during alignment;
retaining a first article on at least a first of the one or more trolleys, such that the first article is moveable with the first of the one or more trolleys along one or both of the track system and the one or more carriers;
retaining one or more additional articles on additional of the one or more trolleys, such that the additional articles are moveable with the additional of the one or more trolleys, respectively, along one or both of the track system and the one or more carriers;
transferring the first and additional of the one or more trolleys to the track system during use of the first and additional articles; and
transferring the first and additional of the one or more trolleys to the one or more carriers during nonuse of the first and additional articles.

\* \* \* \* \*